(12) United States Patent
Odate (10) Patent No.: US 7,698,038 B2
(45) Date of Patent: Apr. 13, 2010

(54) VEHICLE SEAT BELT APPARATUS

(75) Inventor: Shotaro Odate, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 392 days.

(21) Appl. No.: 11/801,979

(22) Filed: May 11, 2007

(65) Prior Publication Data

US 2007/0284868 A1 Dec. 13, 2007

(30) Foreign Application Priority Data

Jun. 9, 2006 (JP) ............... 2006-161601

(51) Int. Cl.
*B60R 22/46* (2006.01)
(52) U.S. Cl. ............... 701/45; 180/268; 280/801.1; 250/231.13
(58) Field of Classification Search ............ 701/45, 701/46, 47; 180/268; 280/801.1; 250/231.13
See application file for complete search history.

(56) References Cited

U.S. PATENT DOCUMENTS 5,558,370 A * 9/1996 Behr ............ 280/806
6,198,788 B1 * 3/2001 Calamatas ........... 377/16
6,290,160 B1 9/2001 Strobel
6,300,884 B1 * 10/2001 Wilson ............ 341/6
6,425,541 B1 7/2002 Strobel

FOREIGN PATENT DOCUMENTS

| DE | 29908716 U | 9/1999 |
| DE | 19916805 | 7/2000 |
| DE | 19922720 | 11/2000 |
| DE | 10126699 | 12/2002 |
| JP | 2005-297781 | 10/2005 |

* cited by examiner

*Primary Examiner*—Thomas G Black
*Assistant Examiner*—Peter D Nolan
(74) *Attorney, Agent, or Firm*—Carrier, Blackman & Associates, P.C.; Joseph P. Carrier; William D. Blackman (57) ABSTRACT

Vehicle seat belt apparatus includes: a belt reel; a motor for driving the belt reel to take up a belt; a rotation detection section for detecting rotation of the belt reel; and a failure determination section for determining, on the basis of a detection signal output from the rotation detection section, whether or not the rotation detection section is currently in a failed state. The rotation detection section includes Hall ICs for generating first and second pulse signals that have characteristics such that temporal relationship between the first and second pulse signals is reversed in accordance with the rotating direction of the belt reel.

6 Claims, 6 Drawing Sheets

(A) PULSE SIGNAL P1

(B) PULSE SIGNAL P2

(C) NUMERICAL VALUE OF P1  0 0 1 1 0 0 1 1 0 0 1 1 0 0 1 1
(D) NUMERICAL VALUE OF P2  0 1 1 0 0 1 1 0 0 1 1 0 0 1 1 0

(B) (PRECEDING VALUE) - (CURRENT VALUE) :        000010000010000010000010000010000

(C) CNT :                                        000011111122222233333344444

FIG.9

VEHICLE SEAT BELT APPARATUS

FIELD OF THE INVENTION

The present invention relates generally to vehicle seat belt apparatus, and more particularly to an improved vehicle seat belt apparatus equipped with a failure detection function suited to detect a failure of a retractor that takes up a seat belt.

BACKGROUND OF THE INVENTION

Japanese Patent Laid-Open Publication No. 2005-297781 (JP 2005-297781 A) discloses a seat belt apparatus, which includes a rotation amount detection section for detecting a rotation amount of a belt reel in order to accurately determine current pay-out and take-up amounts of a belt from and to a retractor. In this disclosed seat belt apparatus, the rotation amount detection section includes a rotation sensor attached directly to the rotation shaft of the belt reel of the retractor, and thus, even though the belt reel is not always connected to a reel driving motor, current pay-out and take-up amounts of the belt can always be detected with a sufficient resolution. More specifically, the rotation amount detection section comprises a rotatable magnetic disk coupled to the shaft of the belt reel, and a magnetic sensor having two Hall ICs. Two phase-shifted pulse waveform signals are output from the two Hall ICs. Rotating direction of the belt reel can be identified in accordance with a phase shift state between the two pulse waveform signals, and a rotation amount of the belt reel can be identified in accordance with the number of pulses in either one of the two pulse waveform signals.

However, with the disclosed seat belt apparatus, which does not have a function for determining whether or not the rotation amount detection section is currently out of order or in a failed state, it is not possible to determine whether the rotation amount detection section is operating normally. Thus, when the rotation amount detection section is not operating normally, there is the possibility that erroneous determinations will undesirably take place in control operations of the seat belt apparatus.

Further, there have been known seat belt apparatus provided with a gunpowder-type pretensioner mechanism. In the event there has occurred an emergency that causes activation of the gunpowder-type pretensioner mechanism and requires operations of the seat belt apparatus beyond the resolution of the rotation amount detection, it becomes important to compulsorily inhibit the above-mentioned function for detecting a failure of the rotation amount detection section.

SUMMARY OF THE INVENTION

In view of the foregoing prior art problems, it is an object of the present invention to provide an improved vehicle seat belt apparatus which is equipped with a rotation detection section for detecting rotation of a belt reel of a retractor, and which can accurately determine a failure of the rotation detection section to thereby reliably prevent an erroneous determination due to the failure of the rotation detection section.

It is another object of the present invention to provide an improved vehicle seat belt apparatus which, if equipped with a rotation detection section for detecting rotation of a belt reel of a retractor and a gunpowder-type pretensioner mechanism activated in case of an emergency, can reliably eliminate an influence of the detection of the rotation detection section when rapid displacement has occurred in the belt due to activation of the gunpowder-type pretensioner mechanism.

In order to accomplish the above-mentioned objects, the present invention provides an improved vehicle seat belt apparatus, which comprises: a belt reel; a motor for driving the belt reel to take up a belt; rotation detection section for detecting rotation of the belt reel; and a failure determination section for determining, on the basis of a rotation detection signal output by the rotation detection section, whether or not the rotation detection section is currently in a failed state. With such arrangements, any failure of the rotation detection section (rotation sensor) attached to a seat belt retractor can be accurately determined by the failure determination section.

Preferably, the rotation detection section includes: a pulse generation section for generating a set of pulse signals comprising first and second pulse signals having characteristics such that a temporal relationship (or order) between the first and second pulse signals is reversed in accordance with a rotating direction of the belt reel; a rotational state detection section for detecting a rotational state of the belt reel on the basis of states of the set of pulse signals; and a rotation angle variation detection section for detecting a rotation angle variation state of the belt reel on the basis of a variation in the rotational state of the belt reel detected by the rotational state detection section. Here, the failure determination section determines a failure of the rotation detection section on the basis of the rotational state detected by the rotational state detection section. Because the pulse generation section, included in the rotation detection section, generates the first and second pulse signals shifted in phase from each other, the present invention can accurately determine normality/abnormality of the function of the rotation detection function using the pulse signals.

Desirably, the failure determination section determines a failure of the rotation detection section by detecting that the respective states of the first and second pulse signals have inverted simultaneously.

Preferably, the vehicle seat of the present invention further comprises: a rapid displacement detection section for detecting rapid displacement of the belt; and an invalidation section for invalidating a determination signal, output by the failure determination section, when the rapid displacement detection section has detected rapid displacement of the belt. As rapid displacement occurs in the belt, the two pulse signals rise too rapidly, so that rising edges (and hence falling edges) of respective waveforms of the two pulse signals, originally set to be shifted in phase from each other, occur substantially simultaneously. At that time, the failure determination section erroneously determines that a failure has occurred in the rotation detection section, and thus, the invalidation section in the invention invalidates the determination signal (i.e., failure occurrence determination signal), output by the failure determination section, so as to eliminate unnecessary operations responsive to the erroneous failure determination.

In a preferred form, the rapid displacement detection section detects a rapid change in the rotation angle variation detected by the rotation angle variation detection section. In this case, rapid displacement of the seat belt is detected from a variation in the rotation angle, and thus, this inventive arrangement can work effectively during both taking-up and paying-out of the belt.

Preferably, the rapid displacement detection section detects activation of a gunpowder-type pretensioner mechanism. When the gunpowder-type pretensioner mechanism has been activated, the determination signal (i.e., failure occurrence determination signal) itself is invalidated by the invalidation section, which can thus render monitoring displays of the rotation angle etc. unnecessary, simplify necessary processing and reduce system loads.

According to the present invention, which includes the rotation detection section for determining a failure of the rotation detection section, it is possible to accurately determine a failure of the rotation detection section and thereby prevent an erroneous failure determination. Further, in the case where the present invention is equipped with a gunpowder-type pretensioner mechanism, and when rapid displacement has occurred in the seat belt due to activation of the gunpowder-type pretensioner mechanism, the present invention can eliminate influences on control operations responsive to the rotation detection operation by the rotation detection section.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
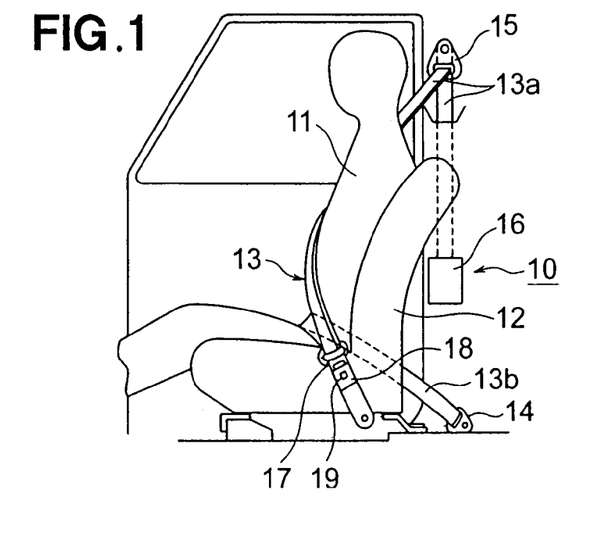
FIG. 1 is a side view showing a seat belt apparatus according to an embodiment of the present invention which is provided on a seat of a vehicle.
Figure 2:
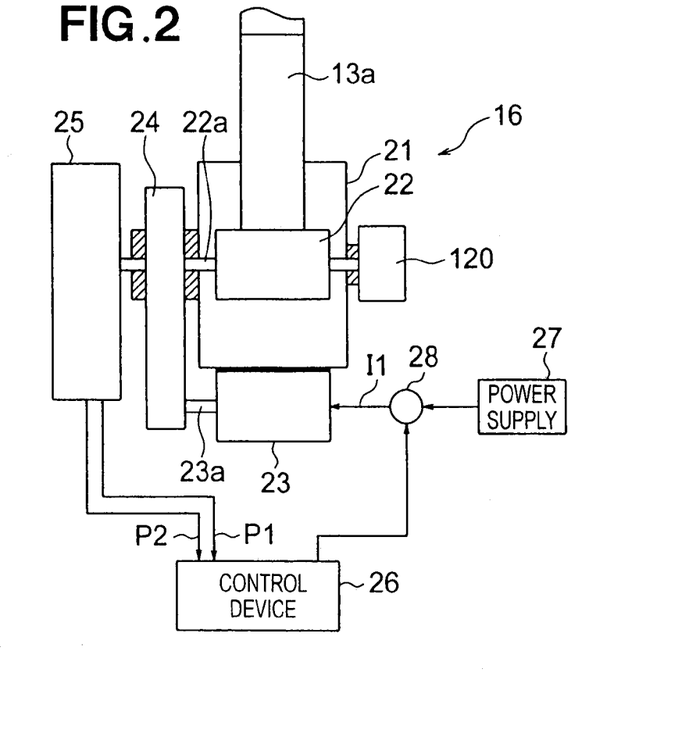
FIG. 2 is a diagram showing primary sections of a seat belt retractor in the seat belt apparatus according to an embodiment of the present invention.

Reference initially made to FIG. 1 showing a seat belt apparatus 10 according to an embodiment of the present invention which is provided on, for example, a driver seat of a vehicle, and to FIG. 2 showing an example construction of a seat belt retractor employed in the embodiment.

In FIG. 1, the seat belt apparatus 10 includes a belt (webbing) 13 for tying the body of a vehicle occupant 11 to the seat 12. The belt 13 includes an upper belt portion 13a for tying an upper body portion of the vehicle occupant 11, and a lower belt portion 13b for tying a waist portion of the vehicle occupant 11. The lower belt portion 13b is connected at one end to a vehicle body portion, located in a lower area of a vehicle compartment, by means of an anchor plate 14. The upper belt portion 13a is folded back via a through-anchor 14 provided near a shoulder of the vehicle occupant 11, and it is connected at one end to a belt reel 22 of the retractor 16. Tongue plate 17 is attached to a region of the belt 13 where distal ends of the upper and lower belt portions 13a and lower belt portion 13 merge with each other. The tongue plate 17 is detachably attachable to a buckle 18 fixed to one side of a lower seat section of the seat 12, and a buckle switch 19 for detecting connection, to the buckle 18, of the tongue plate 17 is provided in the buckle 18.

FIG. 2 shows a construction of the seat belt retractor 16. The retractor 16 includes the belt reel (spindle) 22 rotatably mounted in a housing 21, and a motor 23 for rotationally driving the belt reel 22. The upper belt portion 13a is connected at the one end to the belt reel 22 as noted above, so that it is taken up by the belt reel 22. The belt reel 22 has a shaft 22a connected, via a power transmission mechanism (e.g., gear mechanism) 24, to a drive shaft 23a of the motor 23; thus, the belt reel 22 is rotationally driven by the motor 23 via the power transmission mechanism 24. The retractor 16 also includes a rotation detection section 25 connected to the shaft 22a of the belt reel 22.

The rotation detection section 25 preferably comprises a rotation angle sensor that is, for example, in the form of a magnetic sensor comprising a combination of a rotatable magnetic disk and two Hall ICs. Minimum resolution of the rotation angle sensor is, for example, 4° that is in the order of about 1.3-1.6 mm in terms of the length of the belt.

Figure 3:
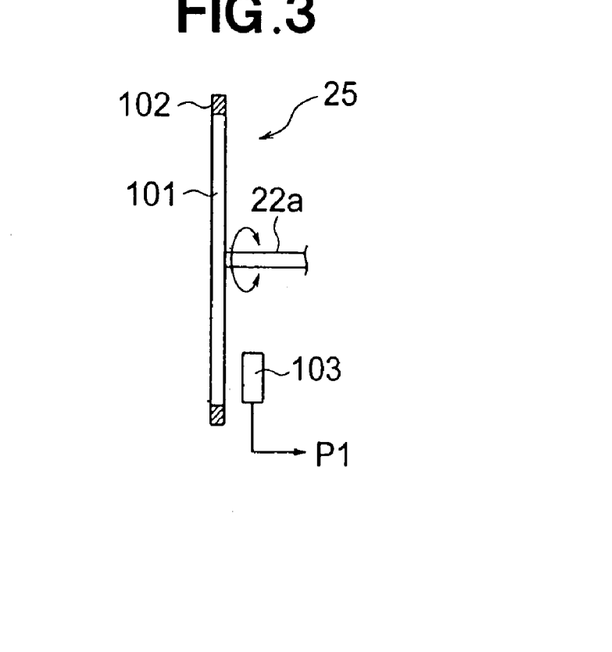
FIG. 3 is a schematic side view showing a construction of a rotation detection section attached to the retractor.
Figure 4:
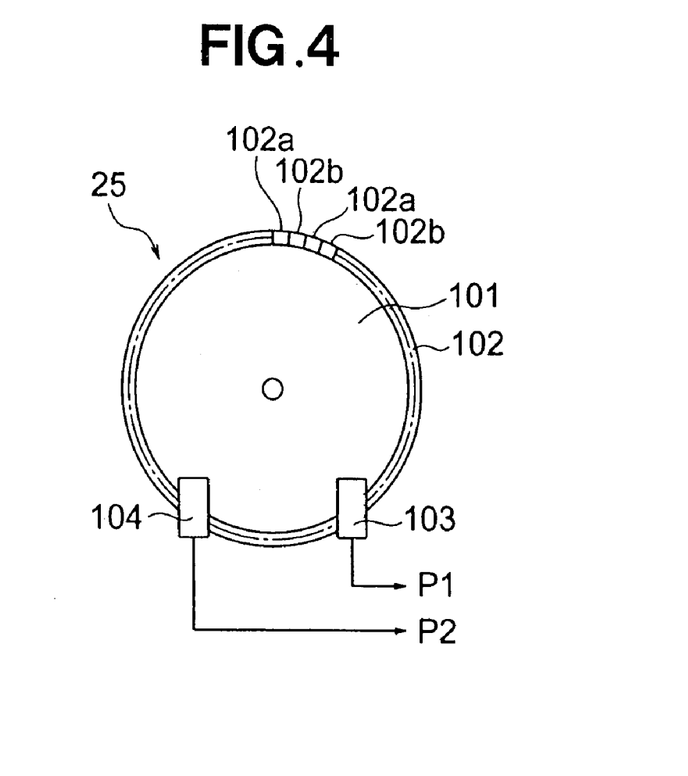
FIG. 4 is a schematic front view showing the construction of the rotation detection section attached to the retractor.
Figure 5:
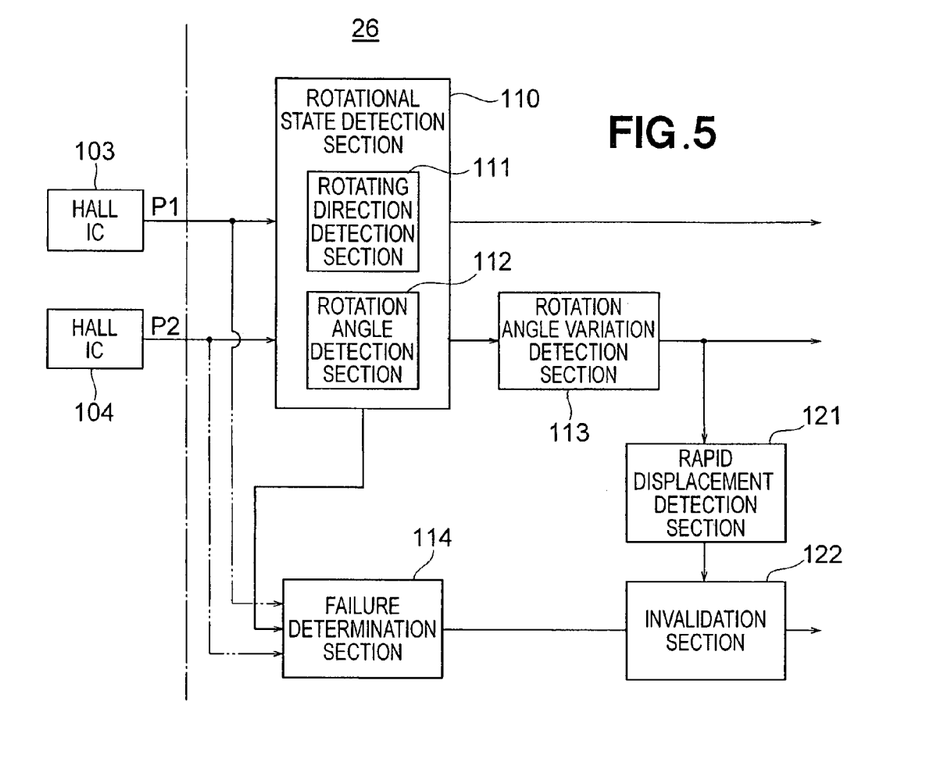
FIG. 5 is a block diagram showing various functions implemented by a control device in the seat belt apparatus.

FIGS. 3 and 4 are a schematic side view and front view, respectively, showing a construction of the rotation detection section 25 comprising the magnetic sensor, and FIG. 5 is a block diagram showing various functions implemented by a control device in the seat belt apparatus. Central portion of the above-mentioned magnetic disk 101 of the magnetic sensor is connected to the shaft 22a of the belt reel 22, so that the magnetic disk 101 rotates as the shaft 22a of the belt reel 22. The magnetic disk 101 has an annular magnetic pole section 102 having alternately-arranged minute N and S pole regions 102a and 102b and formed along the in outer circumferential edge of the magnetic disk 101; normally, the annular magnetic pole section 102 is formed through magnetization processing. The N and S pole regions 102a and 102b each have a size necessary to achieve the above-mentioned minimum resolution of the rotation angle sensor. The two Hall ICs 103 and 104, which are magnetically responsive to the N and S pole regions 102a and 102b of the annular magnetic pole section 102, are disposed in suitable positions in proximity to the magnetic pole section 102 of the magnetic disk 101. The two Hall ICs 103 and 104 respectively output two pulse signals P1 and P2, shifted in phase from each other by a predetermined amount, on the basis of positional relationship between the two Hall ICs 103 and 104 and relationship between the Hall ICs 103, 104 and the individual magnetic poles of the magnetic pole section 102 of the magnetic disk 101. On the basis of the phase relationship between the two pulse signals P1 and P2, it is possible to detect a rotating direction of the shaft 22a of the belt reel 22, i.e. whether the shaft 22a of the belt reel 22 is rotating in a belt taking-up direction or in a belt paying-out direction. Stated differently, the two pulse signals P1 and P2 have the characteristics that the temporal relationship (or order) between the two pulse signals P1 and P2 is reversed in accordance with the rotating direction of the shaft 22a of the belt reel 22. Further, it is possible to detect an angle of rotation (or amount of rotation) effected by the rotation of the shaft 22a of the belt reel 22, by counting the number of pulses in either one of the two pulse signals P1 and P2.

The two pulse signals P1 and P2, output from the aforementioned rotation detection section 25, are supplied to the control device 26 as illustrated in FIG. 2. As will be described below in relation to FIG. 5, the control device 26 has various functions (functional sections) for performing various signal processing by use of the two pulse signals P1 and P2 supplied from the rotation detection section 25.

As shown in FIG. 5, the control device 26 includes a rotational state detection section 110 for detecting a rotational state of the belt reel 22, on the basis of the two pulse signals P1 and P2, to output a rotational state detection signal. The terms "rotational state" is used herein to represent a broad concept including the above-mentioned rotating direction and rotation angle of the belt reel 22, although the terms should not be construed as limited to the rotating direction and rotation angle alone. In other words, the rotational state detection section 110 is a functional section for detecting and processing a rotational state of the shaft 22a of the belt reel 22 having the belt 13 wound thereon. The rotational state detection section 110 includes a rotating direction detection section 111 and rotation angle detection section 112. Rotation angle variation detection section 113 receives a rotation angle detection signal output from the rotation angle detection section 112 of the rotating direction detection section 111, and it detects a variation in the received rotation angle detection signal to thereby output a signal representative of a variation in the rotation angle (hereinafter referred to as "rotation angle variation detection signal"). The rotation angle variation detection signal, output from the rotation angle variation detection section 113, is used as information for detecting a current taken-up position of the belt 13 operated by the belt reel 22; this information will hereinafter be referred to as "belt take-up position detection information". Belt taking-up operation by the retractor 16 is controlled by the control device 26 on the basis of the belt-take-up position detection information.

Figure 9:
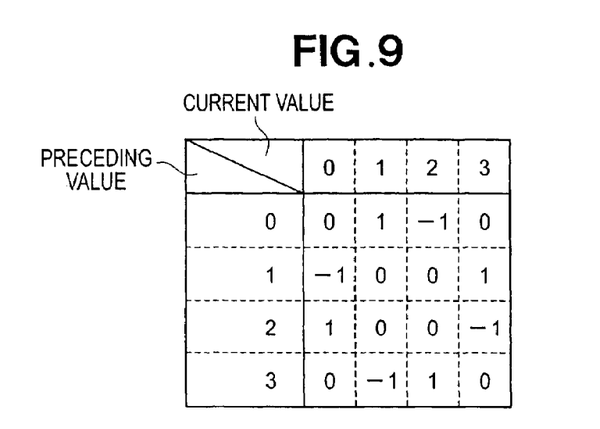
FIG. 9 is a diagram showing a matrix indicating relationship between a preceding value (vertical axis) and current value (horizontal axis)

Further, in FIG. 5, a failure determination section 114 receives the rotational state detection signal supplied from the rotational state detection section 110 and determines, on the basis of the received rotational state detection signal and with reference to a "current value-preceding value" matrix of FIG. 9, whether or not a failure has occurred in the retractor 16, or more specifically in the rotational state detection section 110. Details of processing based on the rotational state detection signal will be discussed later. For example, when respective waveform states of the two pulse signals P1 and P2 have inverted simultaneously, the failure determination section 114 determines that a failure has occurred in the rotational state detection section 110. Alternatively, the failure determination section 114 may directly receive the two pulse signals P1 and P2 supplied from the rotation detection section 25 and determine that a failure has occurred in the rotational state detection section 110 when the waveform states of the received pulse signals P1 and P2 have inverted simultaneously.

The failure determination section 114 outputs a determination signal, i.e. a normal operation detection signal or failure occurrence determination signal (or failure determination signal). As long as the failure determination section 114 outputs the normal operation detection signal, proper operations of the rotational state detection section 110 and rotation angle variation detection section 113 are ensured, and the rotation angle variation detection signal output from the rotation angle variation detection section 113 is used as a basic signal for controlling the belt taking-up or paying-out operation by the retractor 16. When the failure determination section 114 has output the failure occurrence determination signal, the failure occurrence determination signal is referred to, as failure information of the rotational state detection section 110, in subsequent control. Invalidation section 122 is provided downstream of the output end of the failure determination section 114. In normal condition, the invalidation section 122 is kept in its OFF (deactivated) state, and the failure determination section 114 outputs the normal operation detection signal or failure occurrence determination signal.

Referring to FIG. 2, the control device 26 controls the belt taking-up operation of the retractor 16 by controlling, by means of a power supply amount adjustment section 28, an amount of a driving current I1 to be supplied from a power supply 27 to a motor 23. The retractor 16 controlled by the control device 26 is constructed as an electric-type pretensioner for holding the vehicle occupant 11 in a proper posture and position. Once the failure determination section 114 determines that a failure has occurred in the rotational state detection section 110, the operation of the retractor 16 is controlled in view of the detected failure (or failed state).

Next, a description will be given about a gunpowder-type pre-tensioner mechanism section and rapid displacement detection section employed in the instant embodiment. As shown in FIG. 2, the gunpowder-type pretensioner mechanism section 120 is additionally attached to the retractor 16. When an emergent, abnormal condition has occurred during travel of the vehicle, the gunpowder-type pretensioner mechanism section 120 explodes the gunpowder to cause the belt reel 22 to be rapidly rotated, by the explosion power, in the belt taking-up direction, so that the vehicle occupant 11 is rapidly held in place in an emergent locked state. The belt taking-up operating by the gunpowder-type pretensioner mechanism section 120 causes rapid change or displacement, in take-up position, of the belt 13. Once such a gunpowder-type pretensioner mechanism section 120 is activated in case of an emergency, rapid displacement occurs in the belt 13. Such rapid displacement of the belt 13 is detected by the rapid displacement detection section 121 on the basis of the rotation angle variation detection signal output from the rotation angle variation detection section 113. The rapid displacement detection section 121 may detect rapid displacement of the belt 13 caused by other factors, in addition to the rapid displacement caused by the activation of the gunpowder-type pretensioner mechanism section 120; in any case, each displacement of the belt 13 similar in velocity to that caused by the activation of the gunpowder-type pretensioner mechanism section 120 is detected as rapid displacement by the rapid displacement detection section 121.

Once the rapid displacement detection section 121 outputs a rapid displacement detection signal by detecting such rapid displacement of the belt 13, the invalidation section 122 is set to the ON state in response to the rapid displacement detection signal, so that the invalidation section 122 performs a process for invalidating the determination signal (particularly, failure occurrence determination signal) output from the failure determination section 114.

Whereas the seat belt apparatus 10 and the retractor 16 etc. included in the seat belt apparatus 10 have been described above as provided on the driver seat, the same seat belt apparatus 10, retractor 16, etc. are provided on a front passenger seat. In the following description, each apparatus or component provided on the driver seat will be mentioned with a prefix "R-side apparatus", while each apparatus or component provided on the front passenger seat will be mentioned with a prefix "L-side.

Figure 6:
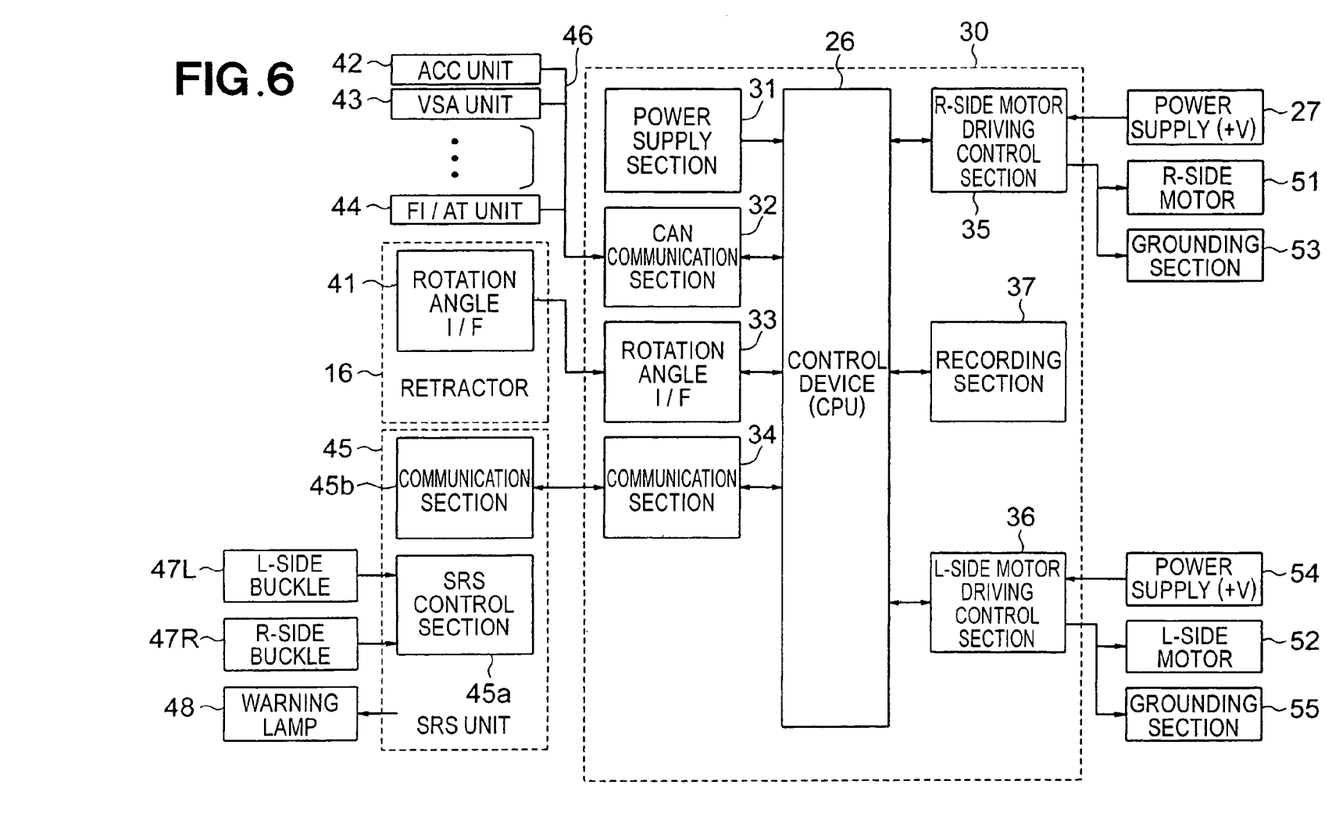
FIG. 6 is a block diagram showing an example general setup of a control system of the seat belt apparatus.

With reference to FIG. 6, the following paragraphs describe an example general hardware setup of a control system for controlling the seat belt apparatus 10 etc.

In FIG. 6, the above-described control device 26 is in the form of a CPU. Block 30 including the control device 26 represents an electric-type pretensioner unit for holding the vehicle occupant in a proper position and posture by means of the seat belt. The block 30 also includes, at an input side of the control device 26, a power supply section 31, in-vehicle network (commonly known as "CAN" or "Controller Area Network") communication section 32, rotation angle interface (I/F) section 33 and communication section 34. The block 30 also includes, at an output side of the control device 26, an R-side motor driving control section 35, L-side motor driving control section 36 and recording section 37 that is in the form of a memory.

Further, at an input side of the block 30, there is provided a block representing the retractor 16 as an example seat belt retractor employed in the instant embodiment. The retractor 16 includes a rotation angle interface (I/F) section 41 for transmitting the detection signals from the rotation detection section 25 to the control device 26. The rotation angle interface section 41 is connected to the rotation angle interface section 33 within the block 33 and transmits the detection signals from the rotation detection section 25 to the block 33. The aforementioned retractor 16 is provided on each of the driver seat, front passenger seat, etc.

At an input side of the block 30, there are further provided an ACC (Adaptive Cruise Control) unit (i.e., unit for controlling an obstacle detection device etc.) 42, VSA (Vehicle Stability Assist) unit (i.e., vehicle behavior stability control unit) 43, FI/AT (Fuel Injection/Automatic Transmission) unit 44, SRS (Supplementary Restraint System) unit 45, vehicle travel state detection unit including a vehicle velocity sensor, etc. Respective output signals of the ACC unit 42, VSA unit 43, FI/AT unit 44, etc. are supplied, via an in-vehicle network 46, to the in-vehicle network communication section 32. The SRS unit 45 includes an SRS control section 45a that receives output signals from an R-side buckle 47R and L-side buckle 47L, and a communication section 45b. The R-side buckle 47R corresponds to the above-mentioned driver-seat-side buckle 18, while the L-side buckle 47L is a buckle of the seat belt apparatus provided on the front passenger seat. The respective output signals from the R-side buckle 47R and L-side buckle 47L are detection signals from buckle switches contained in the buckles 47R and 47L. Once the SRS control section 45a receives the output signal from the R-side buckle 47R or L-side buckle 47L, it transmits the received signal to the communication section 32 of the block 30 via the communication section 45b. Further, when the seat belt is not being used properly during travel of the vehicle, the SRS unit 45 gives a warning signal to a warning lamp 48.

At an output side of the block 30, there are provided an R-side motor 51 and L-side motor 52. The R-side motor 51 is a driving motor for the driver-seat-side seat belt apparatus 10 and provided in correspondence with the R-side motor driving control section 35. The R-side motor driving control section 35 controls an amount of supplied power from the above-mentioned power supply (+V) 27, on the basis of a control instruction signal given from the control device 26, to thereby supply a driving current to the R-side motor 51. Block 53 represents a grounding section. Further, the L-side motor 52 is a driving motor for the front-passenger-seat-side seat belt apparatus 10 and provided in correspondence with the L-side motor driving control section 36. The L-side motor driving control section 36 controls an amount of supplied power from a power supply (+V) 54, on the basis of a control instruction signal given from the control device 26, to thereby supply a driving current to the L-side motor 52. Block 55 represents a grounding section. The grounding sections 53 and 55 are ground terminals forming part of the vehicle body.

The control system for the seat belt apparatus 10 according to the instant embodiment includes, as its basic conceptual components, not only the various components shown in FIG. 5 but also a vehicle traveling condition detection section and vehicle traveling condition determination section.

The vehicle traveling condition detection section comprises at least one of a plurality of various types of sensors, such as a front-rear acceleration sensor for detecting acceleration, in a front-rear direction, of the vehicle, left-right acceleration sensor for detecting acceleration, in a left-right direction (lateral direction), of the vehicle, vehicle velocity sensor, steering angle sensor, traveling wheel velocity sensor, roll angle sensor and turning angle sensor.

The vehicle traveling condition determination section is implemented by an arithmetic operation function of the control device (CPU) 26, which performs a determination process on a traveling condition of the vehicle by comparing a detection signal from the vehicle traveling condition detection section with a predetermined reference value.

Figure 7:
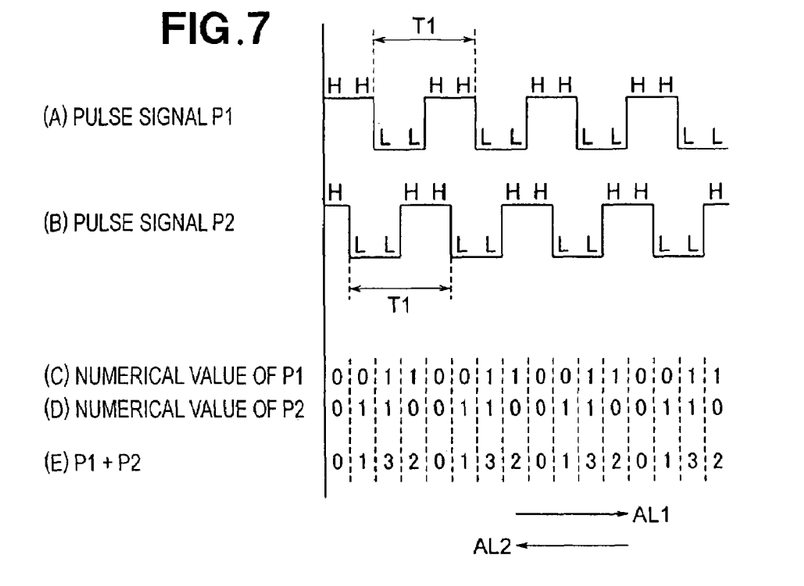
FIG. 7 is a diagram showing example waveforms of two pulse signals, output from two Hall ICs, and numerical values representative of a multiplicity of divisions of the signal waveforms.
Figure 8:
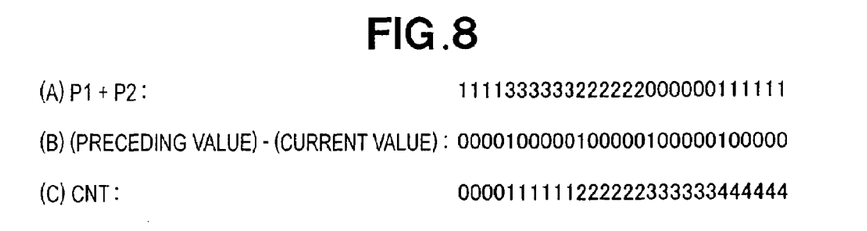
FIG. 8 is a diagram showing patterns of the numerical values of the waveforms in further divided values.

With reference FIGS. 7 to 9, the following paragraphs explain characteristic control performed by the control system for the seat belt apparatus 10 shown in FIGS. 2, 5 and 6 and other related components. The characteristic control is directed to a manner in which the failure determination process is to be performed by the failure determination section 114.

FIG. 7 shows example waveforms of the pulse signals P1 and P2 output from the two Hall ICs 103 and 104. The pulse waveform of the pulse signal P1 is of a first phase, while the pulse waveform of the pulse signal P2 is of a second phase shifted from the first phase. The pulse signals P1 and P2 each has a same cyclic period T1, and each predetermined waveform segment or division of each of the pulse signals P1 and P2, obtained by dividing the cyclic period T1 in four, corresponds to an angular range of 90°. Positional relationship between the above-mentioned magnetic pole section 102 of the magnetic disk 101 and the two Hall ICs 103, 104 is set such that pairs of successive divisions (each of the pairs corresponds to an angular range of 180°) of each of the pulse signals P1 and P2 alternately repeat H (high) and L (low) levels. The pulse signals P1 and P2 are shifted in phase from each other by 90°.

In each of the pulse signals P1 and P2, a numerical value "0" is set as the H level and a numerical value "1" is set as the L level; such numerical value setting is performed through electronic circuit arrangements. The thus-set numerical values of the individual waveform divisions of the pulse signals P1 and P2 are visually displayed on a display as indicated in a "numerical value of P1" field in (C) and in a "numerical value of P2" field in (D) of FIG. 7. The numerical values of corresponding waveform divisions of the pulse signals P1 and P2 are added together, through "P1+P2" calculation like "0+0=0", "0+1=1", "1+1=3" and "1+0=2", into values as indicated in (L) of FIG. 7.

Each of the 90° divisions indicated in (C), (D) and (E) of FIG. 7 may be further divided to represent smaller numerical values.

Because of the numerical value conversion indicated in (E) of FIG. 7, a numerical value variation pattern of "3→2→0→1" occurs repetitively as the belt reel 22 rotates in a forward direction i.e., belt paying-out direction) as shown in arrow A1, while a numerical value variation pattern of "3→1→0→2" occurs repetitively as the belt reel 22 rotates in the reverse direction (belt taking-up direction) as shown in arrow A2. In other words, as long as the rotation detection section 25 is in the normally operating state, the numerical value variation pattern of "3→2→0→1" occurs during the forward rotation of the belt reel 22 while the numerical value variation pattern of "3→1→0→2" occurs during the reverse rotation of the belt reel 22.

Thus, as regards the waveform variation of the pulse signals P1 and P2, numerical value shifts of "3→0", "2→1" and "1→2" never occur in the numerical value variation pattern of "P1+P2".

(A) of FIG. 8 indicates a numerical value variation with each of the "P1+P2" values indicated in further divided values (six values), and (B) of FIG. 8 shows numerical values representing difference values between every two adjoining "P1+P2" values in (A) of FIG. 8 calculated in accordance with the matrix of FIG. 9; namely, each of the differences is a calculated result of "preceding value−current value". In (B) of FIG. 8, the difference value, i.e. "preceding value−current value" value, is set at "1" per variation in the "P1+P2". (C) of FIG. 8 shows numerical values each representing an accumulated (or counted) value of the difference values in (B) of FIG. 8. The accumulated value increases by one per variation in the difference value.

FIG. 9 shows in detail the matrix indicating relationship between the preceding value (vertical axis) and the current value (horizontal axis). In this matrix, the value "1" is set for each pair of preceding and current values that can occur in the numerical value variation (or shift) during the forward rotation of the belt reel 22, while the value "−1" is set for each pair of preceding and current values that can occur in the numerical value variation (or shift) during the reverse rotation of the belt reel 22, Further, the value "0" is set for each pair of preceding and current values that can occur in neither the forward rotation nor the reverse rotation of the belt reel 22.

The aforementioned failure determination section 114 receives the pulse signals P1 and P2 supplied from the two Hall ICs 103 and 104 within the rotation detection section 25, on the basis of which it determines whether or not the rotational state detection section 110 is operating normally. While the rotational state detection section 110 is operating normally, the pulse signals P1 and P2 take numerical values that present the "P1+P2" value variation pattern as indicated in (E) of FIG. 7. However, whenever the respective values of the pulse signals P1 and P2 change simultaneously, the difference value, i.e. "preceding value−current value", becomes "0". With such a "0" difference value, the failure determination section 114 can determine that a failure has occurred in the rotational state detection section 110.

Figure 10:
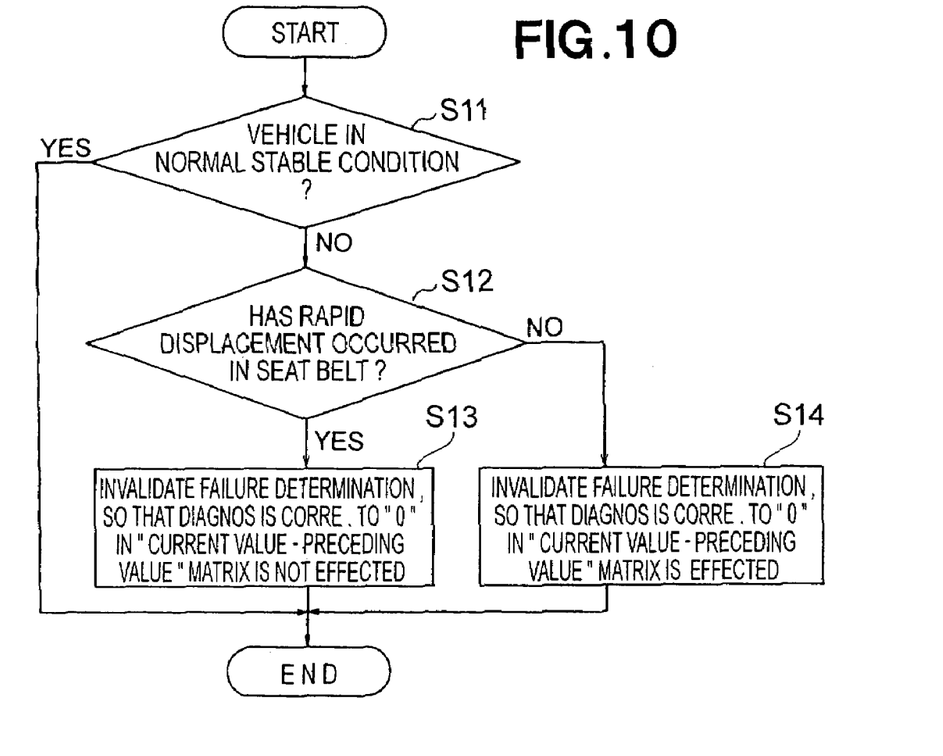
FIG. 10 is a flowchart showing a sequence of basic control operations performed in the seat belt apparatus according to the embodiment of the present invention.

FIG. 10 is a flow chart showing a sequence of basic control operations performed in the seat belt apparatus of the present invention. First, at step S11, a determination is made as to whether the vehicle is currently in normal stable condition. If a YES determination has been made at step S11, it means that the vehicle is operating normally, and thus, the sequence is brought to an end without any other control operation being performed. With a NO determination at step S11, on the other hand, a further determination is made, at step S12, as to whether a rapid change has occurred in the take-up or pay-out amount of the belt 13 to or from the retractor 16; the determination at step S12 is made by the rapid displacement detection section 121 of FIG. 5.

With a NO determination at step S12, a failure diagnosis corresponding to the "0" value in the "current value−preceding value" matrix of FIG. 9 is effected, i.e. the failure determination by the failure determination section 114 is validated, at step S14. With a YES determination at step S12, on the other hand, the failure diagnosis corresponding to the "0" value in the "current value−preceding value" matrix of FIG. 9 is not effected, i.e. the failure determination by the failure determination section 114 is invalidated, at step S13; namely, the failure occurrence determination signal output from the failure determination section 114 is invalidated by the invalidation section 122.

In the aforementioned manner, the failure determination section 114 implemented by the control device 26 performs the failure determination on the basis of the variation states of the two pulse signals P1 and P2 output from the two Hall ICs included in the rotation detection section 25 and in accordance with the numerical value generation pattern ("current value−preceding value" matrix of FIG. 9) based on combinations of the waveforms of the two pulse signals P1 and P2, so that the failure diagnosis corresponding to the "0" value in the matrix is carried out. Further, a variation in the rotation angle, detected by the rotation angle detection signal 112 on the basis of the two pulse signals P1 and P2, is detected by the rotation angle variation detection section 113, and further, when the rapid displacement detection section 121 has detected rapid displacement of the belt, the invalidation section 122 invalidates the determination section output from the failure determination section 114.

It should be appreciated that various constructions, shapes, sizes, positions, etc. explained above are just for illustrative purposes, and that the present invention is not limited to the embodiment described above and may be modified variously without departing from the scope of the appended claims.

What is claimed is:

1. A vehicle seat belt apparatus comprising:
a belt reel;
a motor for driving said belt reel to take up a belt;
a rotation detection section which detects rotation of said belt reel;
a failure determination section which determines, on the basis of a rotation detection signal output by said rotation detection section, whether or not said rotation detection section is currently in a failed state;
a rapid displacement detection section which detects rapid displacement of said belt; and
an invalidation section which invalidates a determination signal, output by said failure determination section, when said rapid displacement detection section has detected rapid displacement of said belt.

2. The vehicle seat belt apparatus of claim 1, wherein said rotation detection section includes:
a pulse generation section which generates a set of pulse signals comprising first and second pulse signals that have characteristics such that a temporal relationship between the first and second pulse signals is reversed in accordance with a rotating direction of said belt reel;
a rotational state detection section which detects a rotational state of said belt reel on the basis of states of said set of pulse signals; and
a rotation angle variation detection section which detects a rotation angle variation state of said belt reel on the basis of a variation in the rotational state of said belt reel detected by said rotational state detection section,
and wherein said failure determination section determines a failure of said rotation detection section on the basis of the rotational state detected by said rotational state variation detection section.

3. The vehicle seat belt apparatus of claim 2, wherein said failure determination section determines a failure of said rotation detection section by detecting that respective states of said first and second pulse signals have inverted simultaneously.

4. The vehicle seat belt apparatus of claim 2, wherein said rapid displacement detection section detects a rapid change in the rotation angle variation detected by said rotation angle variation detection section.

5. The vehicle seat belt apparatus of claim 2, wherein said pulse generation section includes a rotatable magnetic disk coupled to a shaft of said belt reel and a magnetic sensor having a pair of Hall integrated circuits.

6. The vehicle seat belt apparatus of claim 1, wherein said rapid displacement detection section detects activation of a gunpowder-type pre-tensioner mechanism.

* * * * *